United States Patent [19]

Hale

[11] 3,877,532

[45] Apr. 15, 1975

[54] LOW PROFILE SCALE

[75] Inventor: John D. Hale, St. Johnsbury, Vt.

[73] Assignee: Colt Industries Operating Corporation, New York, N.Y.

[22] Filed: Feb. 7, 1974

[21] Appl. No.: 440,329

[52] U.S. Cl. ............................ 177/229; 177/DIG. 9
[51] Int. Cl. ............................................... G01g 3/08
[58] Field of Search ....... 177/216, 229, 255, DIG. 9

[56] References Cited

UNITED STATES PATENTS 3,621,928 11/1971 Sprague .......................... 177/255 X

*Primary Examiner*—George H. Miller, Jr.
*Attorney, Agent, or Firm*—Gardiner, Sixbey, Bradford & Carlson

[57] ABSTRACT

The low profile scale assembly includes a scale platform, a scale base unit, a load sensing means mounted on the scale base unit, and a parallelogram flexure linkage between the scale platform and base unit for applying vertical load forces to the sensing means. This flexure linkage includes first and second spaced, horizontally coplanar parallel elongated beams, the first beam being connected to the scale base unit and the second beam being connected to the scale platform. Upper and lower parallel, spaced flexure plates extend between the beams and provide little resistance to vertical load forces. The sensing means may include an electronic load cell connected to the second beam which provides a load signal to an electronic measuring circuit.

21 Claims, 5 Drawing Figures

3
10
12
14
16
18
20
22
26
28
30
32
34
36
38
40
42
44
46
48
50
52
54
56
58
60
62
64
66
68
70

82
84
86
88
90
92
94
96
98
100
102
104
106
108
110
112
114

LOW PROFILE SCALE

BACKGROUND OF THE INVENTION

Electronic weighing systems have, in recent years, replaced mechanical scale units for applications where large, costly weighing installations having a high degree of accuracy are required. However, for low capacity weighing applications where a low cost, portable, shock resistant scale unit is desirable, mechanical scales are still universally employed. Electronic systems provide rapid response, a high degree of accuracy, versatility and an electronic digital indication, but such systems are normally mounted in a nonportable, permanent installation which includes provision for electrical power and often some environmental protection. Low capacity mechanical scales, on the other hand, may be operated with no power supply under adverse environmental conditions, are portable and highly resistant to shock, and may be purchased and maintained economically.

It is a primary object of the present invention to provide a novel and improved low profile electronic scale assembly for low capacity weighing applications which is comparable in price, portability and durability with mechanical scales of similar capacity. This scale provides the rapid response, versatility and electronic display normally provided by high cost electronic weighing systems.

Another object of the present invention is to provide a novel and improved low profile scale assembly which includes a parallelogram flexure linkage for transmitting load induced forces to a load sensing unit. The parallelogram flexure linkage insures that off center loads or external moments will be taken up in parallel arms of the linkage so that the sensitive axis of the load cell will measure only the vertical component of the load.

A further object of the present invention is to provide a novel and improved low profile scale assembly which includes a parallelogram flexure linkage to stabilize a scale platform so that a vertical load, applied at any point on the scale platform, will appear at a single transducer within the scale structure as a true vertical load unaffected by vector components of forces, twist, or horizontal movement of the scale platform. The parallelogram flexure linkage provides a low profile without precise tolerances or dimensions affecting the parallelogram. The parallelogram dimensions may be readily adjustable to provide a well regulated adjustment at the time of scale calibration.

Another object of the present invention is to provide a novel and improved low profile scale assembly which includes a parallelogram flexure linkage having unitary leg sections. Controlled deformation of the parallelogram linkage is accomplished by an adjustment system to vary linkage dimensions for calibration.

These and other objects of the present invention will become readily apparent from a consideration of the following specification and claims taken in conjunction with the accompanying drawings in which:

Figure 1:
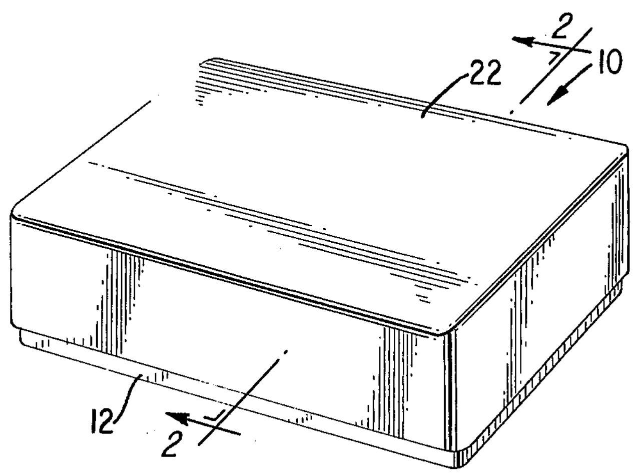
FIG. 1 is a perspective view of the low profile scale assembly of the present invention.

Referring now to FIGS. 1–4, the low profile scale assembly of the present invention indicated generally at 10 includes a base 12 formed by a rectangular steel frame having two spaced, substantially parallel, end beams 14 joined by substantially parallel, spaced, side beams 16. A similar rectangular steel frame formed by spaced end beams 18 and side beams 20 is spaced from the base 12 and supports a load platform 22. The only connection between this load platform frame and the base 12 is a parallelogram flexure linkage and load cell to be subsequently described. The load platform may be formed of stainless steel or similar material and is of unitary construction to form an inverted box-like enclosure for the internal scale components. The load platform is secured to the side beams 20 by bolts, rivets or other similar connecting units 26 which extend through the platform and into receivers 28 secured to the side beams. The platform rests on shock pads 30 positioned between the underside of the platform and side beams 20.

The base 12 includes a rigid mount 32 which extends between the end beams 14 and is secured thereto at either end. This mount supports the electronic package for the scale indicated in dotted lines at 34 in FIG. 2, which is potted in waterproof material so that the scale unit 10 is not only moisture resistant but may be completely immersed in fluid. The mount also supports a load cell 36 which preferably constitutes a cantilever beam cell of conventional construction. Obviously other known load responsive transducers may be employed for the load cell 36 to effectively convert a load induced force to an analog signal indicative of the load, said analog signal then being received by the circuit of said electronic package and employed thereby to provide a weight indication output to drive a suitable electronic indicator. Also hydraulic, pneumatic or other known load cells can be used, and in these instances, no electronic circuit or a special electronic circuit responsive to a hydraulic, pneumatic or mechanical output will be employed. If the electronic circuit is eliminated, a mechanical or pressure responsive indicator might be operated by the load cell.

The load platform 22 and associated supporting frame are suspended from the load cell 36 by means of a parallelogram flexure linkage 38. This linkage is used to stabilize the load platform so that a vertical load applied at any point to the platform will appear at the load cell 36 as a true vertical load unaffected by vector components of forces, twist, or horizontal movement of the platform. The optimum proportions for such a parallelogram linkage would provide a relatively long vertical dimension as compared to the length of the horizontal parallel arms thereof. These proportions would result in minimum couple forces at the pivot points of the linkage, thus simplifying the mechanical construction of the linkage and minimizing any vertical components of the couple forces which may result from slight errors in parallelogram geometry. Unfortunately, these optimum proportions cannot be achieved within the minimum height requirements of a low profile scale. Therefore, in such scales utilizing a parallelogram linkage, couple forces and errors from variations in parallelogram geometry become significant. It is generally not possible to fabricate and assembly a parallelogram linkage for a low profile scale with sufficient precision to eliminate variations in geometry, and therefore it has been necessary to provide some means for adjusting one or both vertical legs of the parallelogram for calibration purposes. In the past, this adjustment has entailed the use of a composite rather than a unitary parallelogram leg structure with various leg sections being relatively adjustable. A good illustration of such an adjustable parallelogram linkage is provided by U.S. Pat. No. 3,185,236 to Lawrence S. Williams.

The parallelogram flexure linkage 38 operates effectively to provide an extremely low profile scale without requiring precise tolerances on dimensions for the parallelogram. The vertical dimensions of the parallelogram linkage may be accurately adjusted while still employing unitary members in the preferred construction to form the vertical legs of the parallelogram.

The vertical legs of the parallelogram flexure linkage 38 are formed from spaced tubes 40 and 42 extending horizontally in parallel spaced relationship. The ends of the tube 40 are secured by welding at 44 to the end beams of the base 12 while the ends of the tube 42 are secured by welding at 46 to the end beams 18 of the load platform support frame. Suitable means other than welding may be employed to rigidly secure the tube 40 to the base and the tube 42 to the load platform support frame. The upper surfaces of the tubes 40 and 42 are flattened at 48 and the lower surfaces of the tubes are flattened at 50 to provide mounting surfaces for the horizontal legs of the parallelogram flexure linkage. These horizontal legs are formed by an upper flexure plate 52 and a lower flexure plate 54 extending respectively between the mounting surfaces 48 and 50. Each flexure plate is formed by a laminar steel sheet having transverse sections of reduced thickness extending across the sheet adjacent opposite ends thereof. These sections of reduced thickness provide thin flexure hinges 56 which are pivot points for the parallelogram flexure linkage near opposed end sections 58 of the flexure plates which are of increased cross section to provide end mounts for the flexure plates. These end mounts rest on the flattened mounting surfaces 48 and 50 of the tubes 40 and 42 and are secured thereto by mounting bolts 60 which extend completely through the end mounts 58 for the upper and lower flexure plates and the tube supporting the respective end mounts.

A bracket 62 is secured to the tube 42 and is connected to a suspension bolt 64 which extends between the bracket and the load cell 36. Thus the parallelogram flexure linkage suspends the load platform 22 from the load cell by means of the suspension bolt 64. Additionally, the tubes 40 and 42 space the load platform support frame from the base 12 and provide rigid cross braces for the base and platform support frame which enhance the strength and durability of the scale unit.

The thin flexure hinges 56 of the parallelogram flexure linkage are quite strong and very resistive to forces in a horizontal plane, but are very flexible in a vertical plane and offer very little resistance to small vertical forces induced by loads on the load platform 22. To protect the load cell 36 from overloads and shock induced forces which might occur as a result of loads dropped on the platform, overload assemblies are provided at each corner of the scale unit. These overload assemblies include vertically adjustable overload bolts 66 mounted for vertical movement at each corner of the base 12 beneath corner stops 68 formed at each corner of the load platform support frame. In response to an overload on the scale load platform, the bolts 66 will contact the stops 68 to prevent further vertical deflection of the load platform support frame and possible damage to the parallelogram flexure linkage and load cell structures.

As an additional protection for the load cell 36, an overload stop 70 is formed on the base 12 beneath the suspension bolt 64. This stop guards against damage to the load cell which might occur if a heavy load is dropped in the center of the load platform. Deflection at the center of the load platform and load platform support frame might cause forces which will damage the load cell. Such damage is precluded by contact between the suspension bolt 64 and the overload stop 70. The suspension bolt, like the overload bolts 66 can be vertically adjusted to vary the overload safety factor provided thereby.

In addition to absorbing horizontal couple forces developed by an off center load on the load platform 22, the horizontal flexure plate arms of the parallelogram flexure linkage operate in a manner similar to conventional scale flexures to resist other external horizontal forces and to maintain the load platform fixed in position horizontally with relation to the base and load cell mounted thereon. Errors in parallelogram geometry may be corrected at the time of scale calibration by using the bolts 60 to adjust the dimensions of the parallelogram flexure linkage. Since these bolts pass through the tubes 40 and 42 which form the vertical legs of the parallelogram, the bolts may be tightened to very slightly squeeze or deform an associated tube to an extent required to correct errors resulting from movement of a test weight from point to point around the scale platform. Since this adjustment is a "screw" adjustment, a well-regulated correction results from a specific movement of the bolt, and calibration is both accurate, easily accomplished and relatively permanent. There is little likelihood that the parallelogram flexure linkage will become uncalibrated during use since the tubes 40 and 42 form a unitary structure which is permanently deformed to achieve calibration.

Figure 3:
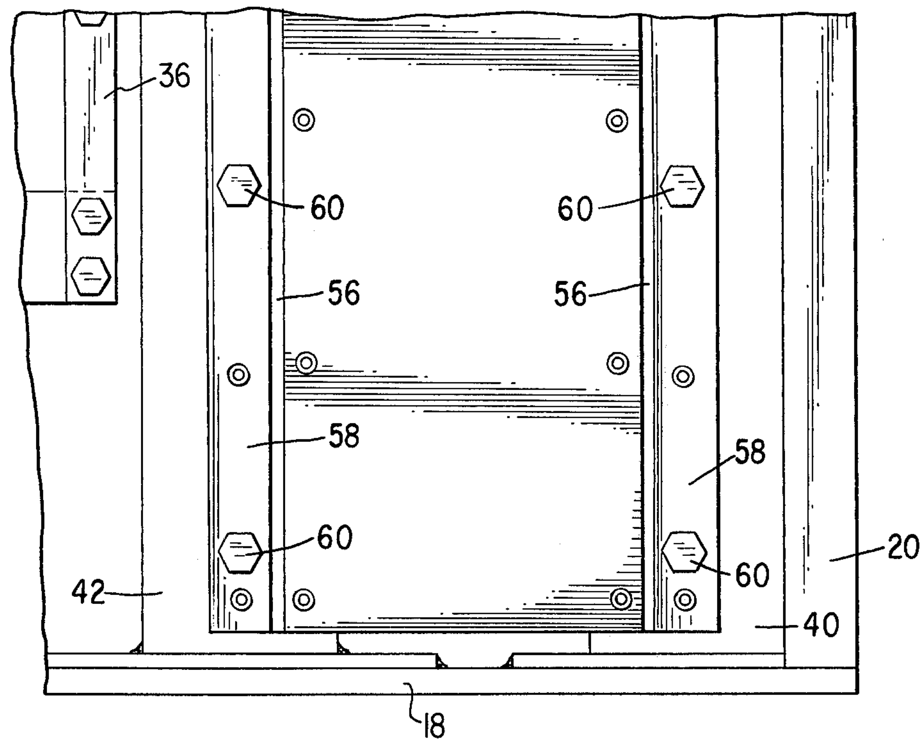
FIG. 3 is a sectional view taken along lines 3—3 of FIG. 2.
Figure 4:
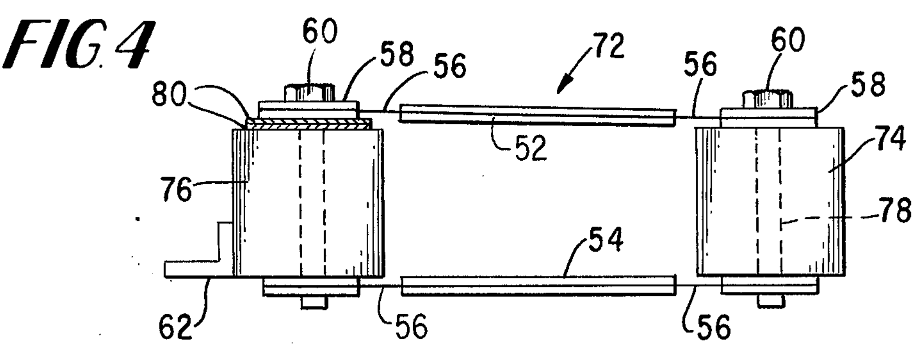
FIG. 4 is a view in side elevation of an alternate embodiment of the parallelogram flexure linkage of FIG. 2.

FIG. 4 illustrates a parallelogram flexure linkage 72 which may be used in some scale structures to replace the linkage 38. In the linkage 72, the tubes 40 and 42 are replaced by solid metal bars 74 and 76 having vertical bolt receiving channels 78 extending therethrough for the bolts 60. Since the bars cannot be deformed by adjusting the bolts 60, shims 80 are placed between a bar and the flexure plate supported thereby to adjust the vertical dimensions of the parallelogram. The use of shims, wedges or similar equivalent structures for calibration is normally not as desirable as the use of the tubes 40 and 42 of FIG. 3, but for some applications, the added strength provided by the solid bars 74 and 76 may be required. The bar 74 will be secured to the base 12 and the bar 76 will be secured to the load platform support frame in the same manner as were the tubes 40 and 42.

The low profile scale assembly of FIGS. 1–4 is an extremely durable electronic scale assembly capable of operating effectively even when handled absuively or subjected to abusive environmental conditions. The tubes 40 and 42 of FIG. 2 or the bars 74 and 76 of FIG. 4, which form elongated reinforcing beams for the steel base and load platform, also contribute to the low profile configuration of the scale. These reinforcing beams form the vertical legs of the parallelogram flexure linkage 38, and since the height of these beams is small compared to the length thereof, a very low profile linkage results. The strength imparted to the scale by the beams of the parallelogram flexure linkage causes the structure to be extremely stable and resistant to abuse. Additionally, the fact that the electronic circuitry for the scale is mounted upon the scale base as a unitary structure and is completely encased in a moisture resistant compound renders the scale resistant to liquids and enables the scale to operate even after being completely immersed in a liquid. Thus, the resultant scale structure will withstand high shock forces and is substantially unaffected by moisture and other liquid environments.

Figure 2:
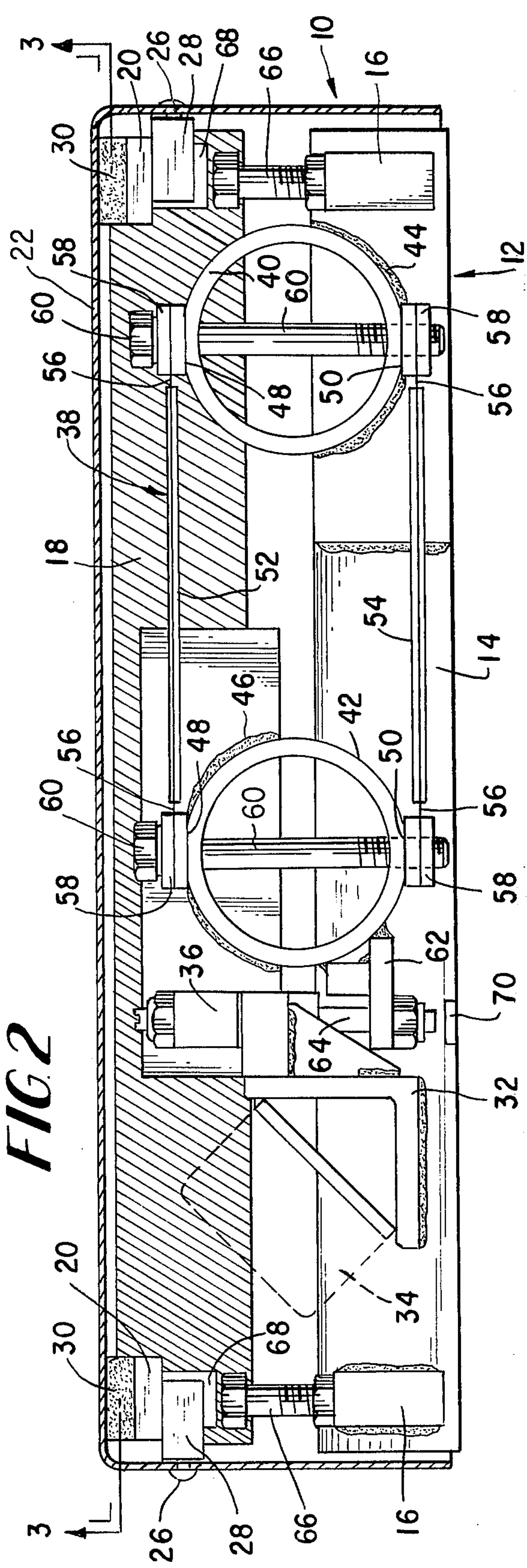
FIG. 2 is a sectional view taken along lines 2—2 of FIG. 1.
Figure 5:
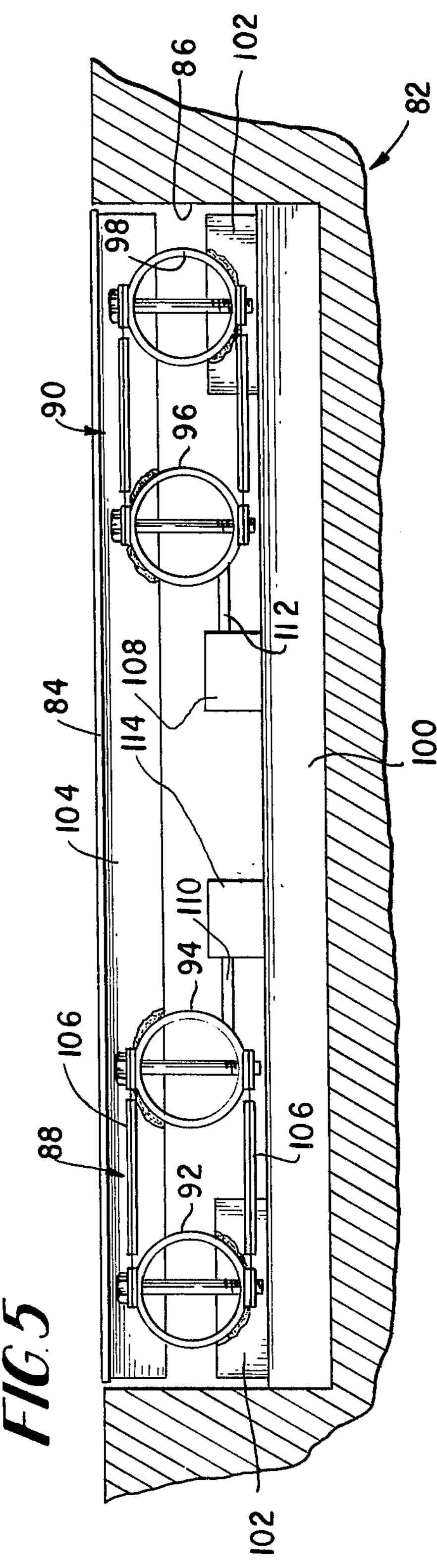
FIG. 5 is a sectional view illustrating a low profile highway scale incorporating the parallelogram flexure linkage of the present invention.

The parallelogram flexure linkage assembly 38 of FIGS. 2–4, although being particularly adaptable for use in a low profile portable electronic scale, is also structurally adpated for incorporation in much larger low profile scales, such as a low profile highway scale as illustrated generally at 82 in FIG. 5. Highway scales employ an extremely long scale platform 84 which is quite subject to torsional stress when a heavy vehicle passes on to the platform and thereby loads one end of the platform. Since the parallelogram flexure linkage previously described lends structural rigidity to a scale platform while causing the scale to accurately indicate a weight applied at any portion of the platform, this linkage may be effectively employed with the large platforms of highway scales. Highway scales generally include a pit 86 below the scale platform for receiving the scale mechanism, and the depth of this pit may be minimized by the parallelogram flexure linkage of the present invention which imparts a very low profile to the highway scale.

The parallelogram flexure linkage employed with the highway scale 82 is identical in construction to the linkages 38 or 72 of FIGS. 2 and 4, with the exception that the highway scale linkage is obviously much larger in size. Although only a single parallelogram linkage might be used for the highway scale, it is preferably to provide at least two such parallelogram flexure linkages 88 and 90 at opposite ends of the scale platform to obtain enhanced structural stability and strength. Tubular beams 92 94, 96, and 98 of the flexure linkages extend completely across the width of the scale platform 84 with the outermost beams 92 and 98 being secured to the base 100 of the scale. The base of the scale may constitute the concrete bottom of the pit 86, and the tubular beams 92 and 98 may be secured thereto in any suitable manner so that these beams are maintained in parallel, horizontal coplanar relationship. For example, mounting plates 102 secured to the scale base 100 may be provided at each end of the tubular beams 92 and 98 so that the ends of the tubular beams may in turn be secured to the mounting plates by welding or other suitable means. Similarly, the innermost tubular beams 94 and 96 are secured at either end to the frame 104 of the scale platform 84.

The tubular beams of each of the parallelogram flexure linkages 88 and 90 are connected together by flexure plates 106, and each of these parallelogram flexure linkages is identical in construction to that disclosed and described in connection with FIG. 2. It must also be recognized that each of the parallelogram flexure linkages 88 and 90 might incorporate the linkage structure disclosed and described in connection with FIG. 4.

Although a single load cell might be provided for both of the parallelogram flexure linkages 88 and 90, it is anticipated that these linkages might suitably be connected to separate load cells 108 and 114. This may be accomplished by links indicated diagrammatically at 110 and 112 which are secured to the innermost tubular beams 94 and 96 of the parallelogram flexure linkages 88 and 90. The inner ends of these links will be suitably connected to operate the load cells 108 and 114 mounted upon the base 100 of the scale or upon the side walls of the pit 86.

Even when separate load cells are used for each of the parallelogram flexure linkages 88 and 90, the platform 84 must be constructed to provide for expansion and contraction. This can be accomplished in many known ways, such as providing the platform frame with sliding plates to permit expansion and construction.

In an unloaded condition of the scale, the beams 92, 94, 96, and 98 of the parallelogram flexure linkages are maintained in substantially parallel, horizontal coplanar relationship. The application of a load to the platform 84 causes these linkages to apply a corresponding force to a load cell which then generates in known manner an electrical signal or hydraulic, pneumatic or mechanical outputs indicative of this force. Obviously the scale structure 82 may incorporate overload checks of the type similar to that disclosed in FIG. 2, or other overload structures of conventional type.

IT will be readily apparent to one skilled in the art that the present invention provides an extremely durable low profile scale structure particularly adapted for use in environments previously not suited for electronic scales.

I claim:

1. A low profile weighing assembly comprising scale platform means for receiving a load, support means spaced beneath said scale platform means, and parallelogram flexure linkage means operating to connect said scale platform means to said support means and to apply vertical forces induced by a load on said scale platform means to load sensing means, said parallelogram flexure linkage means including first and second spaced linkages positioned beneath said scale platform means, each such linkage including first and second elongated beams arranged in spaced substantially parallel co-planar relationship and extending substantially parallel to said scale platform means, said first elongated beam being connected to said support means and said second elongated beam being connected to said scale platform means and flexure plate means secured to and extending between said first and second elongated beams in substantially parallel relationship to said scale platform means and operating to offer low resistance to forces applied vertically to said scale platform means, said flexure plate means including vertically spaced upper and lower flexure plates extending in substantially parallel relationship between said first and second elongated beams.

2. The low profile weighing assembly of claim 1 wherein the ends of said first elongated beams are secured to said support means and the ends of said second elongated beams are secured to said scale platform means, the first and second elongated beams of said first and second linkages being mounted in parallel, coplanar relationship.

3. A low profile weighing assembly comprising scale platform means for receiving a load, support means spaced beneath said scale platform means, and parallelogram flexure linkage means operating to connect said scale platform means to said support means and to apply vertical forces induced by a load on said scale platform means to load sensing means, said parallelogram flexure linkage means including first and second elongated beams arranged in spaced, substantially parallel co-planar relationship beneath said scale platform means and extending substantially parallel thereto, said first elongated beam being connected to said support means and said second elongated beam being connected to said scale platform means and to said load sensing means and flexure plate means extending between said first and second elongated beams, said flexure plate means being secured to said first and second elongated beams and operating to offer high resistance to forces horizontal to said scale platform means and low resistance to forces applied vertically to said scale platform means.

4. The low profile weighing assembly of claim 3 wherein said load sensing means includes load cell means for providing an electrical signal indicative of a force applied thereto and electrical circuit means connected to receive the electrical signal from said load cell means, said electrical circuit means being encased in a liquid resistant material.

5. The low profile weighing assembly of claim 3 wherein said load sensing means includes a cantilever beam load cell, said second elongated beam being connected to suspension means for suspending said second elongated beam from said cantilever beam load cell.

6. A low profile weighing assembly comprising scale platform means for receiving a load, support means spaced beneath said scale platform means, and parallelogram flexure linkage means operating to connect said scale platform means to said support means and to apply vertical forces induced by a load on said scale platform means to load sensing means, said parallelogram flexure linkage means including first and second elongated beams arranged in spaced, substantially parallel co-planar relationship beneath said scale platform means and extending substantially parallel thereto, said first elongated beam being connected to said support means and said second elongated beam being connected to said scale platform means, and flexure plate means extending between said first and second elongated beams in substantially parallel relationship to said scale platform means, said flexure plate means being secured to said first and second elongated beams and operating to offer high resistance to forces horizontal to said scale platform means and low resistance to forces applied vertically to said scale platform means.

7. The low profile weighing assembly of claim 1 wherein said flexure plate means includes vertically spaced upper and lower flexure plates extending in substantially parallel relationship between said first and second elongated beams.

8. The low profile weighing assembly of claim 7 wherein said upper and lower flexure plates are secured at opposite ends to upper and lower support surfaces of said first and second elongated beams, said parallelogram flexure linkage means including calibrating means operable to vary the spacing between adjacent ends of said upper and lower flexure plates.

9. The low profile weighing assembly of claim 8 wherein said calibrating means include spacer shims positioned between a flexure plate and an upper or lower support surface of said elongated beams.

10. The low profile weighing assembly of claim 8 wherein said first and second elongated beams are tubular in configuration, said calibrating means being operable to deform said elongated beams to adjust the vertical dimensions of said parallelogram flexure linkage means.

11. The low profile weighing assembly of claim 7 wherein the opposite ends of said first elongated beam are connected to said support means and the opposite ends of said second elongated beams are connected to said scale platform means, said first and second elongated beams being tubular in configuration.

12. The low profile weighing assembly of claim 11 wherein screw calibration means extend vertically through each said first and second elongated beams, said screw calibration means being operable to deform said elongated beams to adjust the dimensions of said parallelogram flexure linkage means.

13. The low profile weighing assembly of claim 12 wherein said screw calibration means include a plurality of bolts spaced longitudinally along each of said first and second elongated beams, said bolts being used to secure the ends of said upper and lower flexure plates to the upper and lower surfaces respectively of said first and second elongated beams.

14. The low profile weighing assembly of claim 13 wherein in each said upper and lower flexure plate includes a relatively narrow transverse area of less thickness than the remainder of the plate adjacent to but spaced from each end thereof to provide flexure hinges for said parallelogram flexure linkage means.

15. The low profile weighing assembly of claim 7 wherein said first and second elongated beams are substantially identical in configuration and extend substantially across the extent of one dimension of said scale platform means and support means, said first beam providing a rigid brace for said support means and said second beam providing a rigid brace for said scale platform means.

16. The low profile weighing assembly of claim 15 wherein said scale platform means includes a platform frame including spaced, parallel elongated sidebeams joined by spaced, parallel end beams secured to the ends of said sidebeams and a scale platform secured to said frame, the ends of said second beam being rigidly secured to said sidebeams.

17. The low profile weighing assembly of claim 16 wherein said support means forms a scale base unit which includes parallel elongated base sidebeams joined by parallel base end beams secured to the ends of said sidebeams, the ends of said first beam being ridigly secured to said base sidebeams.

18. The low profile weighing assembly of claim 17 wherein said scale platform is of unitary construction and shaped to form an inverted box-like enclosure over said scale base unit.

19. The low profile weighing assembly of claim 17 which includes stop means provided at each corner thereof to limit the vertical movement of said scale platform means toward said scale base unit.

20. The low profile weighing assembly of claim 19 wherein said load sensing means includes a cantilever beam load cell mounted upon said scale base unit including a cantilever load beam connected to said second elongated beam, and load cell stop means to limit the vertical movement of said cantilever load beam toward said scale base unit.

21. The low profile weighing assembly of claim 20 wherein suspension means are connected between said cantilever load beam and said second elongated beam, said suspension means operating to suspend said second elongated beam from said cantilever beam.

* * * * *